United States Patent
Malia

(10) Patent No.: US 12,266,973 B2
(45) Date of Patent: Apr. 1, 2025

(54) STATOR FOR AN ELECTRIC MOTOR, ENCOMPASSING AN OVERMOLDED METAL FRAMEWORK THROUGH WHICH COOLANT CAN FLOW, HAVING A COVER THAT CAN BE WELDED ON

(71) Applicant: Röchling Automotive SE, Mannheim (DE)

(72) Inventor: Cedric Malia, Volpiano (IT)

(73) Assignee: Röchling Automotive SE, Mannheim (DE)

( * ) Notice: Subject to any disclaimer, the term of this patent is extended or adjusted under 35 U.S.C. 154(b) by 889 days.

(21) Appl. No.: 17/174,649

(22) Filed: Feb. 12, 2021

(65) Prior Publication Data

US 2021/0257868 A1     Aug. 19, 2021

(30) Foreign Application Priority Data

Feb. 18, 2020   (DE) .................... 10 2020 104 263.9

(51) Int. Cl.
*H02K 1/20*     (2006.01)
*H02K 9/197*   (2006.01)

(52) U.S. Cl.
CPC .............. *H02K 1/20* (2013.01); *H02K 9/197* (2013.01)

(58) Field of Classification Search
CPC .......... H02K 5/20; H02K 5/203; H02K 9/197; H02K 1/20
See application file for complete search history.

(56) References Cited

U.S. PATENT DOCUMENTS 4,881,001 A * 11/1989 Patel ...................... H02K 1/185
                                                               310/216.052
5,859,482 A    1/1999 Crowell et al.
(Continued)

FOREIGN PATENT DOCUMENTS

CN         1520631 A    8/2004
DE         1026476 B    3/1958
(Continued)

OTHER PUBLICATIONS

Hoshiko (JP 2019152199 A) English Translation (Year: 2019).*
(Continued)

*Primary Examiner* — Tulsidas C Patel
*Assistant Examiner* — Robert E Mates
(74) *Attorney, Agent, or Firm* — RANKIN, HILL & CLARK LLP

(57) ABSTRACT

A stator for an electric motor, encompassing a carrier component that extends along a virtual longitudinal axis defining an axial direction, the carrier component that is notionally passed through centrally by the virtual longitudinal axis including a carrier portion having an externally located surface; the externally located surface facing in a radial direction orthogonal to the longitudinal axis; the carrier portion including a metal framework overmolded by a thermoplastic carrier plastic, so that the metal framework is surrounded at least in portions by a plastic casing made of carrier plastic; the stator including a cover at at least one axial longitudinal end of the carrier portion; the cover encompassing a connecting configuration having cover plastic compatible with or identical to the carrier plastic; the plastic casing including a counterpart connecting configuration; the connecting configuration being welded to the counterpart connecting configuration.

20 Claims, 4 Drawing Sheets

(56) References Cited

U.S. PATENT DOCUMENTS

| | | | |
|---|---|---|---|
| 6,020,661 | A | 2/2000 | Trago et al. |
| 7,009,316 | B2 | 3/2006 | Ueda et al. |
| 2017/0063190 | A1 | 3/2017 | Hänni et al. |
| 2020/0271121 | A1 | 8/2020 | Arnoldi et al. |

FOREIGN PATENT DOCUMENTS

| | | | | |
|---|---|---|---|---|
| DE | 19506267 | A1 | | 8/1996 |
| DE | 102016224645 | A1 | | 6/2018 |
| JP | 2019152199 | A | * | 9/2019 .............. F04B 17/03 |
| WO | 2010058278 | A2 | | 5/2010 |

OTHER PUBLICATIONS

German Search Report for corresponding DE 10 2020 104 263.9 mailed Nov. 16, 2020, 7 pgs.

Espacenet Bibliographic data: DE 19506267 (A1), Published Aug. 29, 1996, 1 pg.

Espacenet Bibliographic data: DE 102016224645 (A1), Published Jun. 14, 2018, 1 pg.

Espacenet Bibliographic data: WO 2010058278 (A2), Published May 27, 2010, 2 pg.

Espacenet Bibliographic data: CN 1520631 (A), Published Aug. 11, 2004, 1 pg.

\* cited by examiner

STATOR FOR AN ELECTRIC MOTOR, ENCOMPASSING AN OVERMOLDED METAL FRAMEWORK THROUGH WHICH COOLANT CAN FLOW, HAVING A COVER THAT CAN BE WELDED ON

This Application claims priority in German Patent Application DE 10 2020 104 263.9 filed on Feb. 18, 2020, which is incorporated by reference herein.

The present invention relates to a stator for an electric motor, which encompasses a carrier component that extends along a virtual longitudinal axis defining an axial direction.

BACKGROUND OF THE INVENTION

WO 2019/091763 A1 discloses an electric-motor-driven water pump whose stator core is overmolded with a first plastic material; the stator core, the wires, and connecting terminals being overmolded with a second plastic material in order to form a cylindrical annular cap and a heat sink that seals a cylindrical opening of the cap.

US 2017/0063190 A1 discloses a plastic-overmolded stator system of an electric motor, the yoke housing of which is overmolded with a plastic framework, embodied in cage fashion, in order to structurally reinforce the metallic yoke housing. Portions of the outer side of the yoke housing, which is stationary during operation of the known electric motor, are exposed toward the external environment in order to convectively transfer heat to the external environment via those exposed portions.

DE 100 26 476 A1 discloses an electric spindle motor for hard-disk drives, whose lamination stacks and stator windings are overmolded with plastic in order to improve the centerability of the rotor of the electric motor. The lamination stacks are overmolded completely, the stator windings only partially.

U.S. Pat. No. 7,009,316 B2 discloses a rotational electric motor in which the end portions of a stator winding are filled with thermally conductive, electrically insulating plastic. The materials of the stator core, of the stator winding, of the thermally conductive, electrically insulating plastic, and of a frame of the electric motor are selected in such a way that the linear coefficients of thermal expansion of the aforesaid components satisfy a predetermined relationship. Embodied in the stator are coolant channels through which a cooling medium can flow in order to discharge heat from the stator.

US 60206 61 A discloses a stator, embodied by plastic injection molding, of an electric motor. The stator housing is constituted by a stack of grooved sheets encircling a virtual longitudinal axis, in the grooves of which the windings of the stator are received. The grooved-sheet stack is overmolded with thermoplastic.

DE 195 06 267 A1 discloses lamellar grooved components for a stator of an electric motor. The iron portion of the grooved components is constituted by metallic plates that extend in a circumferential direction around the virtual longitudinal axis at a distance therefrom, the thickness direction of the plates extending parallel to the longitudinal axis. A thermoplastic is injection-molded onto the metallic plates in order to connect the metallic plates to a lamellar grooved component. Metallic plates that are immediately adjacent in a circumferential direction form between them a groove that serves respectively to receive a portion of a stator winding.

SUMMARY OF THE INVENTION

The technical object on which the present Application is based is that of allowing known electric motors, embodied in particular for use in motor vehicles, to be produced in simple and reliable fashion with the least possible weight and with particularly high mechanical strength.

The present invention achieves this object by way of a stator for an electric motor as recited initially, the carrier component that is notionally passed through centrally by the virtual longitudinal axis comprising a carrier portion having an externally located surface, the externally located surface facing in a radial direction orthogonal to the longitudinal axis; the carrier portion comprising a metal framework overmolded by a thermoplastic carrier plastic, so that the metal framework is surrounded at least in portions by a plastic casing made of carrier plastic. A cover is arranged at at least one axial longitudinal end of the carrier portion, the cover encompassing a connecting configuration having cover plastic compatible with or identical to the carrier plastic. The plastic casing comprises a counterpart connecting configuration. The connecting configuration is welded to the counterpart connecting configuration.

The result of the metal framework is on the one hand that the rigidity of the carrier component can be increased compared with a carrier component made entirely of plastic, and on the other hand that its weight can be reduced compared with a carrier component made entirely of metal, since metal (constituting a material that is denser compared with the carrier plastic) is used only at locations, and to exactly an extent, required in order to achieve the desired rigidity and strength. The metal framework is preferably embodied as a cage component, i.e. it comprises a plurality of struts that are arranged at a distance from one another transversely to their principal direction of extent. A gap, through which carrier plastic can penetrate upon overmolding of the metal framework with carrier plastic, therefore exists between adjacent struts of the metal framework. The struts can extend in only one direction, for example parallel to the longitudinal axis, which is preferred in a context of sufficiently rigid struts. Alternatively, the metal framework can be a mesh or cage of struts, in which strut groups that extend in different directions, for example in a longitudinal direction and orthogonally thereto in a circumferential direction around the longitudinal axis, are interwoven with one another and/or connected to one another at crossing points. The struts of each strut group of a mesh or cage of struts are also preferably arranged parallel to and at a distance from one another, so that there is formed between adjacent struts a gap through which carrier plastic can flow upon overmolding. Thinner struts can be used when a mesh or cage of struts is utilized, but as a rule more struts are used per unit volume than when the metal framework comprises struts extending in only one direction, or struts that do not cross.

The carrier plastic, having a lower density compared with the metal of the metal framework, can supplement the metal framework to yield the carrier component, so that the latter is not only very strong and rigid, but also low in weight.

Although it can be sufficient to overmold the metal of the metal framework with the carrier plastic only in portions, it is nevertheless preferred if the plastic casing surrounds the metallic components of the metal framework completely, i.e. in a radial direction and in a circumferential direction, at least in a portion located between the longitudinal ends of the metal framework. The metal of the metal framework is thereby shielded from environmental influences. In addition, functional surfaces located externally as a result of the plastic casing can be generated without interruption and in any conformation.

The virtual longitudinal axis of the carrier component directly defines an axial direction. Radial directions extend orthogonally to it, and a circumferential direction extends around it. The virtual longitudinal axis thus defines a cylindrical coordinate system.

The cover is arranged on the carrier component in order to prevent the entry of dirt into a region located radially inside the externally located surface. The use of the plastic casing offers the advantageous capability of welding the cover to the carrier component and thus connecting it permanently to the carrier component. The method used for welding the cover and carrier component can be, for example, an ultrasonic welding method in which the configurations (connecting configuration and counterpart connecting configuration), produced at least from compatible plastics, are heated beyond their softening point, and connected to one another by microscopic movements and by the friction resulting therefrom, at mutually contacting surfaces. The use of additional materials, such as adhesives and the like, can thus be omitted.

Polyolefins, such as polyethylene or preferably polypropylene, or even polyphthalamide, are suitable, for example, as a carrier plastic material and a cover plastic material. In order to increase its strength, the plastic used on the carrier component and/or on the cover can be filled, preferably with glass fibers.

The carrier component serves to carry grooved components embodied separately from the carrier component, for example in the manner of the lamellar grooved components recited above. Grooved components are thus not an integral constituent of the carrier component itself. The grooved components are preferably arranged on the aforementioned externally located surface.

The externally located surface can face radially outward; the rotor then surrounds the stator and its carrier component in cup-shaped fashion. Alternatively, the externally located surface can face radially inward. The stator then surrounds a rotor shaft located radially inside the stator. The rotation of the rotor interacting with the stator under discussion here occurs around the virtual longitudinal axis.

According to a preferred design embodiment of the stator under discussion here, one configuration from among the connecting configuration and counterpart connecting configuration can comprise a projection, and the respective other configuration from among the connecting configuration and counterpart connecting configuration can comprise a recess that at least partly receives the one configuration. For maximally uniform securing of the cover on the carrier component along a circumference around the longitudinal axis, the cover preferably comprises a plurality of connecting configurations, and the carrier component comprises a plurality of counterpart connecting configurations. In order to achieve a homogeneous force effect, the connecting configurations and/or the counterpart connecting configurations are preferably arranged equidistantly in a peripheral direction around the longitudinal axis.

Because, according to a preferred refinement of the stator, the externally located surface of the carrier portion carries, during operation of the electric motor embodied with the participation of the stator, at least one grooved-component arrangement for the reception of stator windings, the plastic casing preferably forms the externally located surface of the carrier portion, so that the latter can be embodied, in primary-forming fashion by plastic injection molding, in the conformation that is desired and suitable for reception of the grooved-component arrangement.

Advantageously, the cover with its connecting arrangement can be used to immobilize the grooved-component arrangement in the carrier component, or at least to make a contribution to immobilization thereof. Provision can be made for this purpose that the connecting configuration encompasses at least one projection extending along the longitudinal axis away from a main cover body, and the counterpart connecting configuration encompasses at least one recess receiving that projection. In the completely assembled state, at least one projection of the cover can then physically delimit a motion path of an iron-containing grooved component, received on the externally located surface, along the longitudinal axis relative to the carrier component. In principle, the cover can be manufactured with a motion-delimiting projection of excess length, so that the projection can be cut to length for the respective application instance. It is thereby possible to vary the number of grooved components, and/or their attachment position along the longitudinal axis, on a given carrier component, and nevertheless to arrange the grooved components on the carrier component with zero clearance using the cover that is always of the same design.

According to an advantageous refinement, the simplest and most reliable manner of limiting a motion of at least one grooved component is such that the projection abuts, with its longitudinal end remote from the main cover body, against the grooved component. For immobilization of a plurality of grooved components it is sufficient as a rule, if the projection abuts against the grooved component closest to it in a longitudinal-axis direction, if several grooved components, constituting a grooved-component packet, abut against one another in stacked fashion successively along the longitudinal axis.

The cover preferably comprises a plurality of projections that limit the motion of grooved components. Particularly preferably, a plurality of projections, preferably all the projections, that are provided for securing the cover on the carrier component also serve for motion limitation of the at least one grooved component.

In order to achieve a maximally high proportion of iron while simultaneously decreasing undesired eddy currents in the iron portion of the stator, the grooved-component arrangement received on the operationally ready stator on the externally located surface preferably encompasses a plurality of lamellar iron-containing grooved components, for instance as a grooved-component packet referred to above.

In order to prevent the grooved-component arrangement, manufactured separately from the carrier component and arranged thereon, from twisting around the longitudinal axis relative to the carrier component during operation of the electric motor constituted with the stator, the grooved-component arrangement preferably comprises a twist prevention configuration that interacts with a counterpart twist prevention configuration of the externally located surface in order to secure the grooved-component arrangement against twisting relative to the carrier portion around the virtual longitudinal axis. The twist prevention configuration and the counterpart twist prevention configuration preferably interact positively for twist prevention. Once again, for that purpose one of the configurations from among the twist prevention configuration and counterpart twist prevention configuration can comprise a projection, and the respective other of the configurations can comprise a recess that receives the projection.

Each individual grooved component can comprise an individual twist prevention configuration, or the plurality of grooved components can be packaged into a collective component, in which context at least the collective component comprises the twist prevention configuration.

Because the lamellar grooved component is embodied to be thin in an axial direction (when considering the operationally ready state of the stator), a projection is more advantageous as a twist prevention configuration, since a recess might structurally weaken the lamellar grooved component that is thin in any case.

In order to reduce manufacturing complexity, the counterpart twist prevention configuration can be the counterpart connection configuration, so that two functions can be performed with the constitution of a counterpart configuration on the carrier component. This applies to the particularly preferred case in which both the counterpart twist prevention configuration and the counterpart connecting configuration are respectively a recess.

Particularly preferably, the counterpart twist prevention configuration and the counterpart connecting configuration encompass or are a groove, extending along the longitudinal axis, in the externally located surface, so that both the grooved-component arrangement and the cover, or at least the latter's connecting configuration, can be introduced into the carrier component along the longitudinal axis from an axial longitudinal end, guided by the aforesaid counterpart configurations.

The iron-containing grooved component can be shaped in terms of its conformation in almost any fashion, by the fact that it encompasses a plurality of iron-containing metal plates that are arranged successively in a circumferential direction and pairwise at a distance from one another forming a groove between them, and are connected to one another by a connecting component made of plastic. Metal plates, which can be matched in terms of their conformation to the respective application instance, can thereby be connected to one another by a connecting component manufactured in primary-forming fashion. The metal plates can comprise a rectangular, trapezoidal, triangular, or other suitable end surface. The end surface of the metal plate is the end face orthogonal to the thickness direction of the metal plate. The metal plate has two of these end surfaces.

The metal plates of a grooved component are usually arranged with their thickness direction parallel to the longitudinal axis. An interstice in which, on the completed stator, a portion of a stator winding is received is constituted between two metal plates adjacent in a circumferential direction.

Undesired eddy currents beyond metal plates that are adjacent along the longitudinal axis can be avoided, with little manufacturing complexity, by the fact at least one, preferably exactly one, plate end surface facing in an axial direction is covered at least in portions by the plastic of the connecting component. In principle, consideration can be given to covering both oppositely located plate end surfaces respectively with plastic, but this results in an unnecessarily large axial distance between two axially adjacent metal plates, and thus to an unnecessarily small iron proportion for a predefined arrangement space. It is sufficient, for electrical insulation of two axially adjacent metal plates, if only exactly one plate end surface is covered at least in portions with plastic material in the context of injection of the plastic material in order to form the connecting component. Preferably all the lamellar iron-containing grooved components of a grooved-component arrangement are embodied substantially identically, so that with an identical alignment of the grooved components that succeed one another along the longitudinal axis, no axially adjacent metal plates are in metallic, and therefore electrically conductive, contact with one another.

In order to dissipate heat generated during operation of the electric motor constituted with the stator, the stator can encompass a plurality of cooling channels. The metal framework preferably encompasses a plurality of cooling channels through which a cooling medium can flow. Metal, preferably aluminum because of its low density, has a higher thermal conductivity than the carrier plastic of the plastic casing, so that a greater quantity of heat per unit time can be dissipated with a metal framework through which cooling medium flows than if the same cooling-medium flow were flowing through cooling channels only in the plastic casing.

The cooling channels are preferably embodied in the struts referred to above, which, constituting tubular struts, can be configured with an inner cavity. Struts having a circular flow cross section, for instance cylindrical tubes, are conceivable in principle. In order to achieve a cooling-medium flow that is quantitatively as high as possible, however, it is preferable to use shell-like struts that extend over a larger region, preferably at least four to five times as large a region, in a circumferential direction around the longitudinal axis than in a radial direction. Because these shell-like struts are arranged around the longitudinal axis, they preferably have a curved, for instance arc- or kidney-shaped, cross section when considering a section in a section plane orthogonal to the longitudinal axis.

In order to enable maximally complete overmolding of each cooling channel, cooling channels from among the plurality of cooling channels are preferably arranged in a circumferential direction around the longitudinal axis separately and at a distance from one another, a portion of the plastic casing being constituted between at least two cooling channels that are adjacent in a circumferential direction. Preferably each cooling channel is surrounded completely, i.e. in both a radial direction and a circumferential direction, by the plastic casing.

For simple and effective connection of the carrier component to further components of the stator and/or of the electric motor constituted with participation of the carrier component, the metal framework can comprise an encircling flange at at least one axial longitudinal end region. The flange thus offers an assembly surface having assembly configurations, such as passthrough holes for the passage of fastening means and the like. For simple assembly with further components, the flange preferably has a larger radial extent than the cooling channels of the metal framework. The plurality of cooling channels preferably protrudes from the flange along the longitudinal axis. The flange therefore extends substantially in a circumferential direction and in a radial direction. Openings, through which cooling medium can be introduced into the cooling channels protruding from the flange, preferably pass through the flange.

In order to avoid undesired interactions with the stator magnetic field, the metal framework is constituted with respect to its weight predominantly, preferably entirely, from nonmagnetic, i.e. non-ferromagnetic, metal.

The metal framework can comprise a respective encircling flange at both axial longitudinal end regions, the plurality of cooling channels preferably connecting the two flanges to one another. A simple and effective metal framework can therefore be constituted by two flanges that are arranged at a distance from one another in an axial direction and are fixedly connected to one another by struts and/or cooling channels.

The carrier component can comprise a respective cover at both longitudinal ends, both covers preferably being embodied in accordance with the description above of the one cover. A single cover design is thus sufficient for covering both longitudinal ends of the carrier component.

The metal framework is preferably constituted from a single metal. Its individual constituents are preferably welded or soldered to one another in order to achieve maximum strength.

To further reduce the weight of the stator, the carrier component can be completely passed through along the longitudinal axis by a cavity located radially inside the externally located surface. When the stator radially externally surrounds the rotor of the electric motor constituted from the stator, the rotor and the rotor shaft are arranged in the cavity. The aforementioned grooved components are then also arranged in the cavity.

For particularly simple production and assembly of the carrier component with little susceptibility to error, the carrier component can advantageously be embodied mirror-symmetrically with respect to a mirror-symmetry plane orthogonal to the longitudinal axis.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
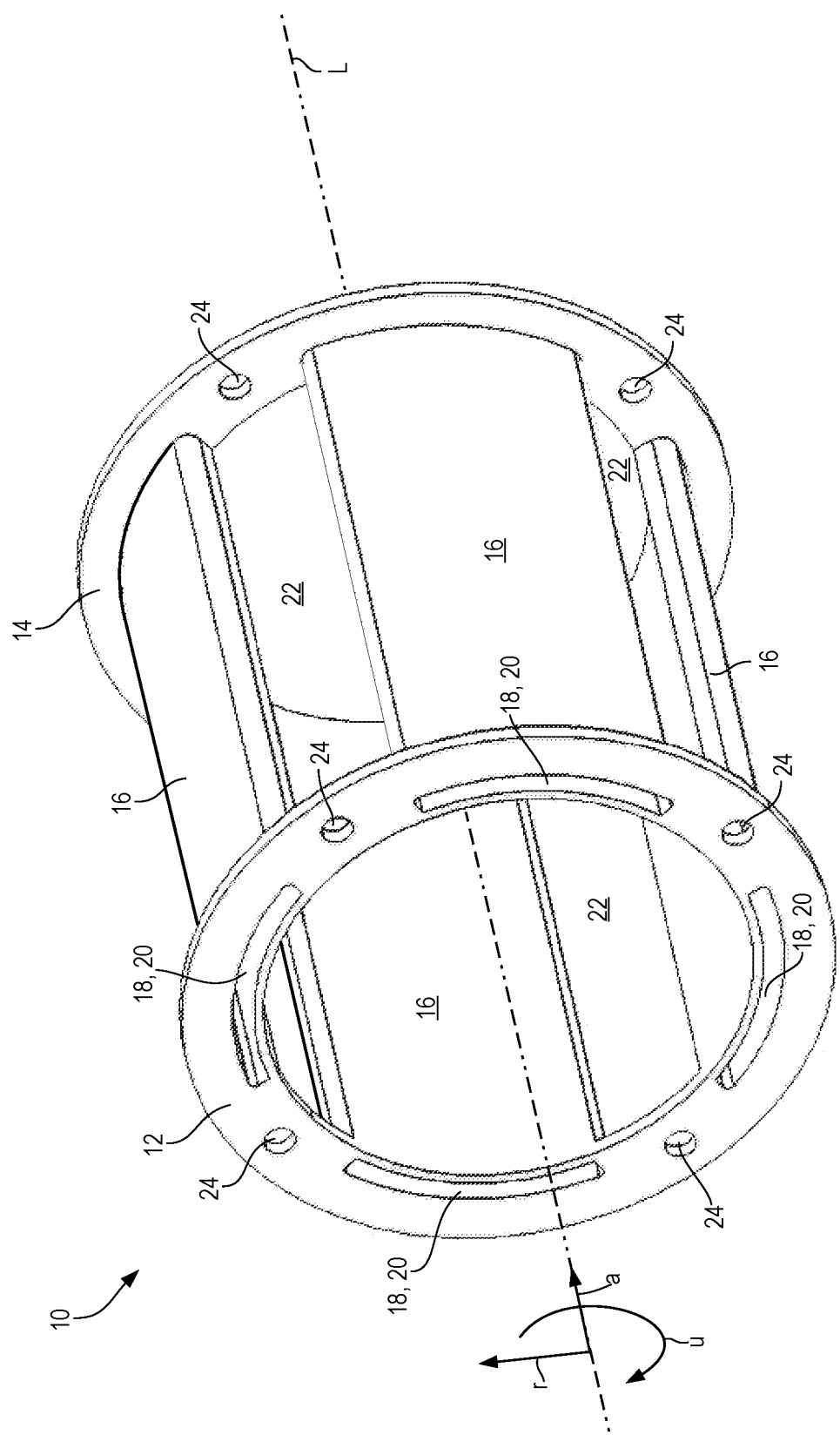
FIG. 1 is a perspective view of a metal framework of a stator according to the present invention.

Referring now to the drawings wherein the showings are for the purpose of illustrating preferred and alternative embodiments of the invention only and not for the purpose of limiting the same, in FIG. 1, a metal framework of a stator according to the present invention is labeled in general with the number 10. Metal framework 10 extends along a virtual longitudinal axis L that defines an axial direction a, radial directions r orthogonal thereto, and a circumferential direction u proceeding around longitudinal axis L. Metal framework 10 encompasses on its two axial end sides a respective flange 12, 14, flanges 12 and 14 being, in the exemplifying embodiment depicted, those component portions of metal framework 10 which have the largest radial dimension.

In the example depicted, flanges 12 and 14 are connected to one another by a total of four struts 16, struts 16 extending parallel to one another along virtual longitudinal axis L. They are connected to flanges 12 and 14 by intermaterial connection by means of a corresponding joining operation, for instance soldering or welding. In the example depicted, struts 16 are constituted from uniform and identical strut components. The longitudinal extent along virtual longitudinal axis L is the largest dimension of struts 16. Their second-largest dimension is their dimension in a circumferential direction u. The inner surface facing radially inward toward virtual longitudinal axis L, and the radially outer surface facing away from virtual longitudinal axis L, of each strut are at a constant distance with respect to virtual longitudinal axis L, i.e. in the example depicted, the aforesaid radially inner and radially outer surfaces are partially cylindrical surfaces having virtual longitudinal axis L as a cylinder axis.

In the exemplifying embodiment depicted, each strut 16 is embodied to be hollow. Each strut 16 thus defines a cooling channel 18 through which a cooling medium, preferably a cooling liquid, can be directed along virtual longitudinal axis L in order to cool, during operation, a stator constituted with the participation of metal framework 10. Cooling channels 18 thus have a cross section that is curved when viewing a section plane orthogonal to virtual longitudinal axis L, and that extends along a circular arc around longitudinal axis L.

Passthrough openings 20, through which cooling medium can be introduced into and directed out of cooling channels 18, are embodied on flanges 12 and 14.

Metal framework 10 is manufactured from non-magnetic metal, preferably from aluminum. It can be produced at least in portions using an aluminum pressure-casting process.

Gaps 22, in which no metal is arranged, are embodied between struts 16 in a circumferential direction u. In the circumferential region of extent of these gaps 22, flanges 12 and 14 have assembly holes 24 that can be passed through by fastening means, for example bolts, rivets, and the like, in order to connect metal framework 10, and carrier component 26 constituted therefrom (see FIG. 2) to further components.

Figure 2:
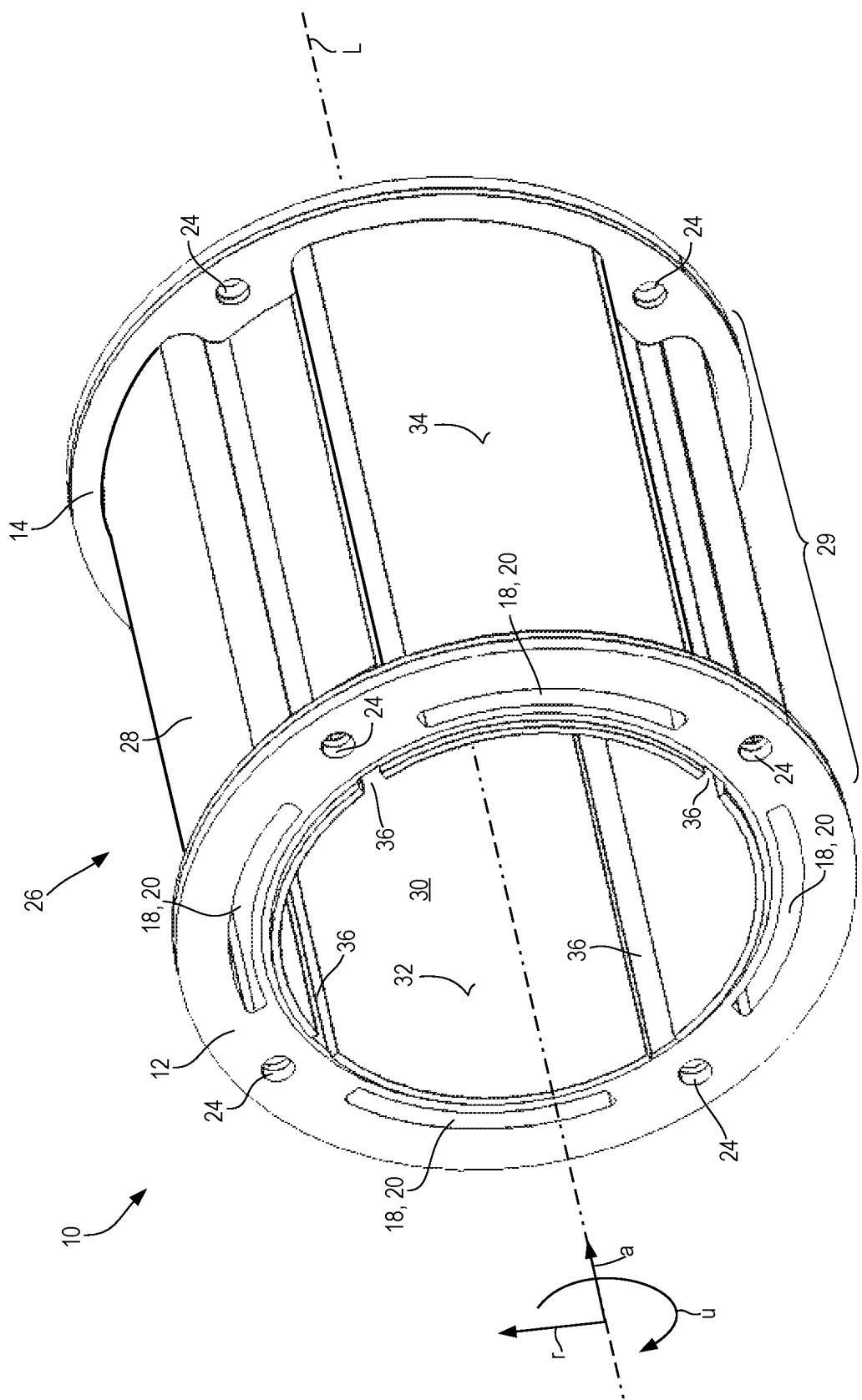
FIG. 2 is a perspective view of a carrier component, having the metal framework of FIG. 1 overmolded with plastic, of a stator according to the present invention.

FIG. 2 depicts a carrier component 26 that encompasses metal framework 10, struts 16 thereof being surrounded completely, in a radial direction r and a circumferential direction u, by a plastic casing 28. The material of plastic casing 28 was overmolded, using an injection-molding process, onto metal framework 10, more precisely onto struts 16 and onto those surfaces of flanges 12 and 14 which face toward one another. In the present exemplifying embodiment, the axial region of extent of plastic casing 28 defines a carrier portion 29. The carrier portion is embodied with a smaller radial dimension in the region of interstices 22 between struts 16 than in the circumferential regions in which struts 16 are located.

Carrier component 26 is passed through axially by a cavity 30 that is delimited radially externally by a surface 32 that is constituted by plastic casing 28 and faces radially inward toward longitudinal axis L. Plastic casing 28 has a further externally located surface 34 on its side facing radially outward.

In the electric motor constituted with carrier component 26, its rotor shaft (not depicted) is received in cavity 30. Externally located surface 32 comprises four surface grooves 36, distributed equidistantly in circumferential direction u, which were constituted in primary-forming fashion as recesses in the context of the generation of plastic casing 28 by injection molding.

As depicted in FIGS. 1 and 2, both metal framework 10 and the carrier component are embodied mirror-symmetrically with respect to a plane orthogonal to the longitudinal axis.

Figure 3:
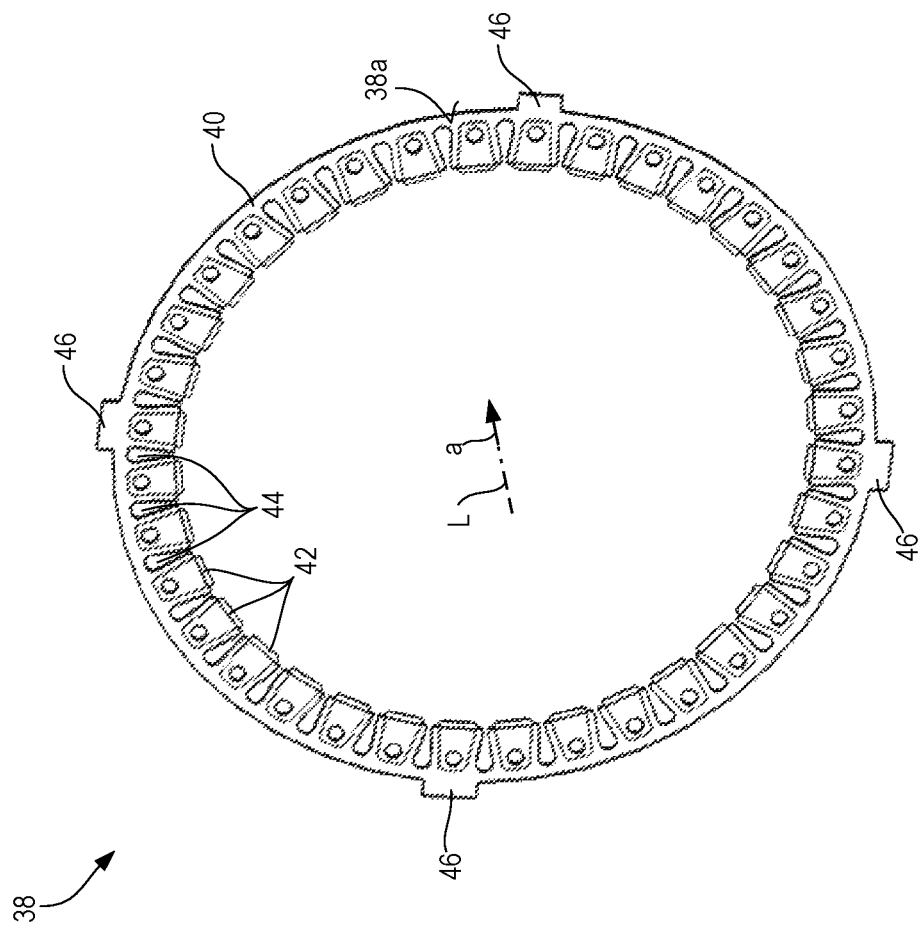
FIG. 3 is a perspective view of a lamellar grooved component for reception in the carrier component of FIG. 2.
Figure 4:
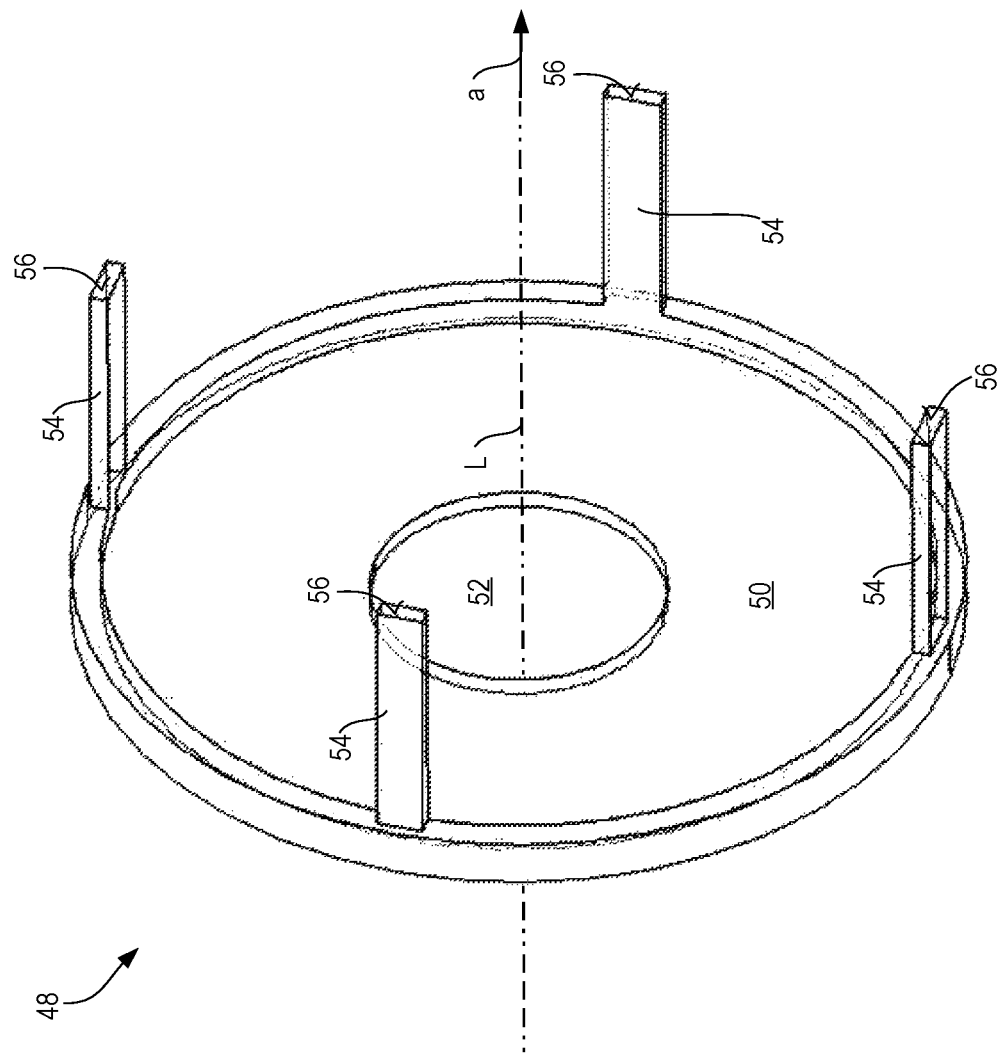
FIG. 4 is a perspective view of a cover for end-side arrangement on the carrier component of FIG. 2.

A plurality of lamellar grooved components 38, one of which is depicted by way of example in FIG. 3, are introduced into cavity 30 in order to constitute a stator.

A grooved component 38 of this kind encompasses an injection-molded connecting component 40 made of plastic which is overmolded onto a plurality of iron-containing metallic plates 42. In the interest of clarity, only a few of the metallic plates are labeled with a reference character 42 in FIG. 3.

Metallic plates 42, oriented with their respective end faces orthogonal to longitudinal axis L, are arranged successively at a distance from one another in circumferential direction u, so that a gap 44, which on the completed electric motor or stator receives a portion of a stator winding, is formed between each two metallic plates 42 that are directly adjacent in a circumferential direction u.

In the exemplifying embodiment depicted, metallic plates 42 protrude radially inward beyond connecting component 40, but are covered by the plastic of connecting component 40 on three sides, i.e. in FIG. 3 on the end face facing toward the viewer of FIG. 3 and on the enveloping surfaces that connect to one another the two end faces of each metallic plate 42.

On the sides facing radially away from metallic plates 42, connecting component 40 comprises, for twist prevention to prevent twisting relative to carrier component 26 around longitudinal axis L, projections 46 that are introduced into grooves 36 of externally located surface 32 along longitudinal axis L. As a result of the introduction of a desired number of substantially identical lamellar grooved components 38, the stator acquires its iron component in order to reinforce the magnetic effect of the stator windings.

Grooves 36 of carrier component 26 thus constitute a counterpart twist prevention configuration; projections 46 of grooved components 38 constitute a twist prevention configuration.

FIG. depicts a cover 48 which, on a stator constituted with the participation of carrier component 26, closes off cavity 30 axially at the end.

Cover 48 comprises a main cover body 50, extending principally in a radial direction, at the center of which an aperture 52 for passage of the rotor shaft is embodied.

Projections 54 project from main cover body 50 at one end, protruding along longitudinal axis L and constituting connecting configurations. Upon assembly of the stator, projections 54 are also introduced along longitudinal axis L into grooves 36 in externally located surface 32 of carrier component 26. In addition, projections 54 and grooves 36 are welded to one another when cover 48 is in the final position, for example by ultrasonic welding. For that purpose, cover 48 and plastic casing 28 are preferably produced from the same plastic, for instance polypropylene, polyamide, or polyphthalamide, so that intermaterial joining of cover 48 and plastic casing 28 is possible.

Projections 54 thus constitute connecting configurations, and grooves 36 constitute counterpart connecting configurations.

On the completed stator, with end surfaces 56 facing in the direction of longitudinal axis L on that longitudinal end of projections 54 which is remote from main cover body 50, cover 48 abuts against a surface 38a, facing in the direction of longitudinal axis L toward cover 48, of grooved component 38 that is axially closest to cover 48, so that cover 48, by way of its projections 54, prevents an axial motion of grooved components 38 in cavity 30. From the opposite side of flange 14, a further cover is introduced with its projections 54 into grooves 36 and welded to plastic casing 28, so that a packet made up of a plurality of grooved components 38, received in cavity 30 nonrotatably on externally located surface 32, is axially secured in axially nondisplaceable fashion on carrier component 26 merely by two covers 48.

Covers 48 can be embodied for that purpose with projections 54 of excess length, and projections 54 can be cut to length for the respective application instance prior to assembly. If the design of the desired stator is known a priori, however, and will not vary, cover 48 can be manufactured by injection molding with projections 54 that fit exactly in terms of their length.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A stator for an electric motor, the stator comprising a carrier component that extends along a virtual longitudinal axis defining an axial direction, the carrier component that is notionally passed through centrally by the virtual longitudinal axis comprising a carrier portion having an externally located surface; the externally located surface facing in a radial direction orthogonal to the virtual longitudinal axis; the carrier portion comprising a metal framework overmolded by a thermoplastic carrier plastic, so that the metal framework is surrounded at least in portions by a plastic casing made of carrier plastic; the stator comprising a cover at at least one axial longitudinal end of the carrier portion; the cover comprising a connecting configuration having cover plastic compatible with or identical to the carrier plastic; the plastic casing comprising a counterpart connecting configuration; the connecting configuration being welded to the counterpart connecting configuration, wherein one of the connecting configuration and the counterpart connecting configuration comprises an axially extending projection, and the respective other of the connecting configuration and the counterpart connecting configuration comprises an axially extending recess that at least partly receives the one of the connecting configuration and the counterpart connecting configuration, the weld between the connecting configuration and the counterpart connecting configuration includes the axially extending projection being welded to the axially extending recess.

2. The stator according to claim 1, wherein the plastic casing forms the externally located surface of the carrier portion, the cover comprising the axially extending projection that extends along the virtual longitudinal axis away from a main cover body, and the axially extending recess comprising an axially extending groove in the externally located surface that is shaped to receive the projection, the shaped engagement between the axially extending projection and the axially extending groove preventing relative rotation between the cover and the carrier portion.

3. The stator according to claim 2, wherein the axially extending projection has a distal end remote from the main cover body, the distal end abutting against an iron-containing grooved component thereby at least partially preventing axial motion of the iron-containing grooved component along the virtual longitudinal axis.

4. The stator according to claim 1, wherein the plastic casing forms the externally located surface of the carrier portion, the cover comprising the axially extending projection that extends along the virtual longitudinal axis away from a main cover body, and the axially extending recess comprising an axially extending groove in the externally located surface that is shaped to receive the projection; the stator further including a grooved-component arrangement comprising a plurality of lamellar iron-containing grooved components, the grooved-component arrangement being received on the externally located surface; the grooved-component arrangement comprising a twist prevention configuration that includes an axially extending ridge shaped to be received in the axially extending groove of the externally located surface in order to secure the grooved-component arrangement against twisting relative to the carrier portion around the virtual longitudinal axis.

5. The stator according to claim 4, wherein the twist prevention configuration and the counterpart connecting configuration comprises a plurality of axially extending grooves, extending along the virtual longitudinal axis in the externally located surface and the axially extending projection being a corresponding plurality of axially extending projections.

6. The stator according to claim 3, wherein the iron-containing grooved component comprises a plurality of iron-containing metal plates that are arranged successively in a circumferential direction around the virtual longitudinal axis and pairwise at a distance from one another forming a groove between them, and are connected to one another by a connecting component made of plastic.

7. The stator according to claim 6, wherein the plurality of iron-containing metal plates of the iron-containing grooved component are arranged with a thickness direction parallel to the virtual longitudinal axis; at least one plate surface facing in an axial direction being covered at least in portions by the plastic of the connecting component.

8. The stator according to claim 6, wherein the plurality of iron-containing metal plates of the iron-containing grooved component are arranged with a thickness direction parallel to the virtual longitudinal axis; only one plate surface facing in an axial direction being covered at least in portions by the plastic of the connecting component.

9. The stator according to claim 4, wherein the plurality of lamellar iron-containing grooved components are arranged successively in a circumferential direction around the virtual longitudinal axis and pairwise at a distance from one another forming a groove between them, and are connected to one another by a connecting component made of plastic.

10. The stator according to claim 9, wherein the plurality of lamellar iron-containing grooved components each comprises a plurality of iron-containing metal plates that are arranged successively in a circumferential direction around the virtual longitudinal axis the plurality of iron-containing metal plates being arranged with a thickness direction parallel to the virtual longitudinal axis; at least one plate surface facing in an axial direction being covered at least in portions by the plastic of the connecting component.

11. The stator according to claim 1, wherein the metal framework comprises a plurality of cooling channels through which a cooling medium can flow.

12. The stator according to claim 11, wherein the plurality of cooling channels are independent cooling channels that are axially extending parallel to the virtual longitudinal axis are circumferentially spaced about the virtual longitudinal axis separately and at a distance from one another, a portion of the plastic casing extending between at least two cooling channels of the plurality of cooling channels that are adjacent in a circumferential direction.

13. The stator according to claim 12, wherein the metal framework includes an encircling end flange at at least one axial longitudinal end region, each of the plurality of cooling channels flowing through the encircling end flange along the virtual longitudinal axis.

14. The stator according to claim 11, wherein the metal framework includes an encircling end flange at at least one axial longitudinal end region, each of the plurality of cooling channels flowing through the encircling end flange along the virtual longitudinal axis.

15. The stator according to claim 14, wherein the metal framework comprises a respective encircling end flange at both axial longitudinal end regions, the plurality of cooling channels connecting the two respective encircling end flanges to one another.

16. The stator according to claim 1, wherein the carrier component is completely passed through along the virtual longitudinal axis by a cavity located radially inside the externally located surface.

17. The stator according to claim 1, wherein the carrier component is embodied mirror-symmetrically with respect to a mirror-symmetry plane orthogonal to the virtual longitudinal axis.

18. The stator according to claim 1, wherein the metal framework includes an encircling end flange at at least one axial longitudinal end region, the plastic casing forms the externally located surface of the carrier portion, the cover comprising the axially extending projection that extends along the virtual longitudinal axis away from a main cover body, and the axially extending recess comprising an axially extending groove in the externally located surface that is shaped to receive the axially extending projection, the axially extending projection extending past the encircling end flange where it engages the axially extending groove, the connecting configuration and the counterpart connecting configuration including a weld between the axially extending projection and the axially extending groove on an inward side of the encircling end flange.

19. A stator for an electric motor, the stator comprising a carrier component that extends along a virtual longitudinal axis defining an axial direction, the carrier component that is notionally passed through centrally by the virtual longitudinal axis comprising a carrier portion having an externally located surface; the externally located surface facing in a radial direction orthogonal to the virtual longitudinal axis; the carrier portion comprising a metal framework having a first axial longitudinal end region and a second axial longitudinal end region with a first encircling end flange at the first axial longitudinal end region and a second encircling end flange at the second axial longitudinal end region, the metal framework further including a plurality of cooling channels through which a cooling medium can flow wherein each of the plurality of cooling channels that each flow through the first and second encircling end flanges along the virtual longitudinal axis, the metal framework being overmolded by a thermoplastic carrier plastic so that the metal framework and the plurality of cooling channels are surrounded at least in portions by a plastic casing made of carrier plastic; the stator comprising a cover at at least one of the first and second axial longitudinal end regions; the cover comprising a connecting configuration having cover plastic compatible with or identical to the carrier plastic; the plastic casing comprising a counterpart connecting configuration; the cover engaging one of the first and second encircling end flanges and the connecting configuration of the cover extending past the one of the first and second encircling end flanges wherein the connecting configuration includes a connecting portion that extends inwardly of the one of the first and second encircling end flanges, the connecting portion of the connecting configuration including a welded connection with the counterpart connecting configuration.

20. A stator for an electric motor, the stator comprising a carrier component that extends along a virtual longitudinal axis defining an axial direction, the carrier component that is notionally passed through centrally by the virtual longitudinal axis comprising a carrier portion having an externally located surface; the externally located surface facing in a radial direction orthogonal to the virtual longitudinal axis; the carrier portion comprising a metal framework having a first axial longitudinal end region and a second axial longitudinal end region with a first encircling end flange at the first axial longitudinal end region and a second encircling end flange at the second axial longitudinal end region, the metal framework further including at least one cooling channel through which a cooling medium can flow wherein the at least one cooling channel has a radially outwardly facing surface and a radially inwardly facing surface, the metal framework being overmolded by a thermoplastic carrier plastic such that the radially outwardly facing surface and the radially inwardly facing surface of the at least one cooling channel is covered at least in portions by a plastic casing made of carrier plastic; the stator comprising a cover at at least one of the first and second axial longitudinal end regions; the cover comprising a connecting configuration having cover plastic compatible with or identical to the carrier plastic; the plastic casing comprising a counterpart connecting configuration; the cover engaging one of the first and second encircling end flanges and the connecting configuration of the cover extending past the one of the first and second encircling end flanges wherein the connecting configuration includes a connecting portion that extends inwardly of the one of the first and second encircling end flanges, the connecting portion of the connecting configuration including a welded connection with the counterpart connecting configuration.

* * * * *